Feb. 17, 1953　　　L. B. FORMAN　　　2,629,007
ELECTROMAGNETIC OPERATOR
Filed Aug. 15, 1950
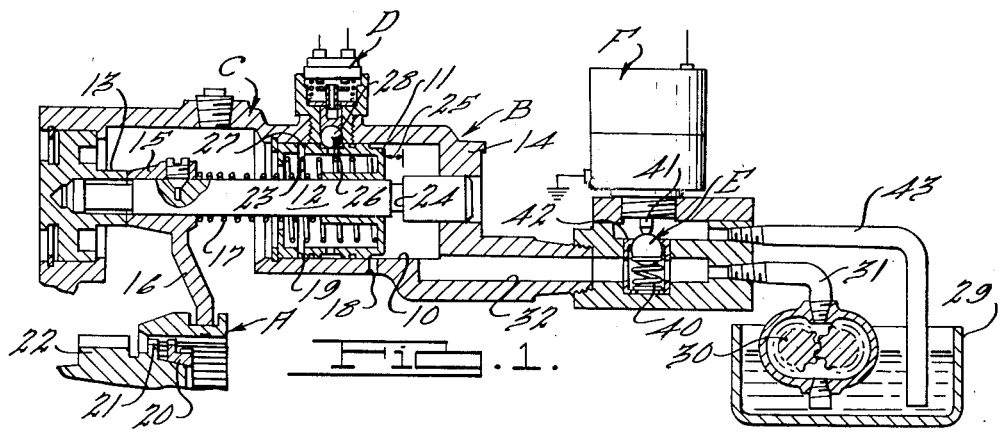
INVENTOR.
Louis B. Forman
BY
Harness and Harris
ATTORNEYS.

Patented Feb. 17, 1953

2,629,007

UNITED STATES PATENT OFFICE 2,629,007

ELECTROMAGNETIC OPERATOR

Louis B. Forman, Detroit, Mich., assignor to Chrysler Corporation, Highland Park, Mich., a corporation of Delaware Application August 15, 1950, Serial No. 179,448

1 Claim. (Cl. 175—336)

My invention relates to electromagnetic operators and more particularly to the type commonly known as solenoids.

The present invention has particular reference to a solenoid utilized for controlling valving in a fluid pressure system where a substantial force is needed to open the valve.

A principal object of my invention is to provide an improved solenoid which is capable of delivering a greater force at the beginning of its stroke compared to the remainder of its stroke relative to those known in the art.

Another object of my invention is to provide an improved solenoid which is easily as well as economically manufactured.

Other objects and advantages will become more apparent from the following description of one embodiment of my invention, reference being had to the accompanying drawings in which:

Fig. 1 is a sectional view of a fluid pressure system illustrating the application of my improved solenoid thereto.

Fig. 2 is a sectional view of a portion of the structure shown in Fig. 1 illustrating the change in the structure when my improved solenoid is energized.

Fig. 3 is a sectional view of the solenoid shown in Figs. 1 and 2 illustrating the internal construction thereof.

Fig. 4 is a diagrammatic view of the force-stroke relationship of a conventional solenoid and my improved solenoid.

In Fig. 1 I have shown an application of my improved solenoid to a fluid pressure system which controls the operation of the motor vehicle transmission. The subject fluid pressure system is more fully described and claimed in the copending application of William A. Hunter, Serial No. 740,425 filed April 9, 1947 and is shown merely for illustration of one application of my invention. The motor vehicle transmission is represented merely by a shift sleeve A which effects different speed ratios when moved by the fluid pressure system, generally designated by the letter B. In Fig. 1 I have illustrated servomotor means in the form of a fluid motor or shift cylinder C. For controlling the shift of sleeve A, this motor comprises a cylinder 10 slidably receiving a piston 11 which slidably receives a rod 12 which is mounted to reciprocate in the guideways 13 and 14. Fixed to this rod is the collar 15 of a yoke 16 connected with sleeve A to effect shift thereof. A relatively small force preloaded engaging spring 17 is threaded on the rod 12 and is disposed between piston 11 and yoke 16 to provide a lost motion thrust transmitting section such that piston 11 may move forwardly or to the left for its power stroke, being limited by relief ports 18 and abutment 19 in advance of the full clutching shift of the sleeve A. In the position of the piston 11, as shown in the drawing, the engaging spring 17 is compressed and this compressed spring then urges the yoke collar 15 towards the left so that the sleeve A is moved into engagement with a blocker 20 and, after coast, with teeth 21 and pinion 22. The yoke collar 15 abuts against the rear end of guideway 13 when the sleeve A has come to rest in its fully engaged upshift position. A kickdown spring 23 is disposed between abutment 19 and piston 11 and serves to return the piston and sleeve A to a position where the piston 11 engages the guideway 14. The spring 23 is thus adapted to effect disengaging movement of the sleeve A relative to the teeth 21. Ports 18 constitute relief ports to prevent pressure, in excess of that required to operate the piston, building up in the hydraulic system. At the same time ports 18 serve as a piston positioning means and eliminate the need for additional piston abutment means. Ports 18 are uncovered just prior to engagement of the piston 11 with abutment means 19, therefore, the pressure against the piston is automatically reduced and the piston is not rammed against the abutment 19.

The rod 12 has a shoulder 25 which engages the face of the piston when the piston is in its furthest rightward position but which, when the piston and rod are moved to the end of their forward strokes, as shown in Fig. 1, is spaced rearwardly of the piston to provide a gap 25 equal to the distance of the strokes of the piston and rods. This gap is utilized to close an ignition control switch D for interrupting the engine ignition system which is connected through this switch. Piston 11 is provided with an annular groove 26 formed in its skirt to define the cam portion 27 which operates the ball actuator 28 for closing switch D.

The pressure fluid supply system has been diagrammatically shown in Fig. 1 and comprises a suitable supply 29 of oil which is usually in the engine transmission sump. A pump 30 draws the oil from the supply 29 for delivery under pressure through pipe 31 hence to the passage 32 under control of a ball valve E. When the valve E is closed, as shown in Fig. 1, the oil is fed directly from the pump 30 through passages 31 and 32 to shift cylinder B where it moves the piston 11 and shift rod 12 to the left thus causing yoke 16 to shift sleeve A to effect a change speed ratio of the vehicle transmission.

Valve E is closed by the spring pressure of a valve spring 40 and the pressure of the fluid medium when a solenoid F located above the ball valve is de-energized and the solenoid plunger extension 41 is in its retracted position as shown in Fig. 1. When the solenoid F is energized, as shown in Fig. 2, the plunger extension 41 is extended and ball valve E is opened by being forced downwardly off valve seat 42 so that oil now flows from the pump 30 through the line 31 to open valve E and back to the supply sump via the return line 43. The open valve E prevents sufficient pressure developing in the system to move the piston 11 against force exerted by the piston retaining spring 23.

Referring now more particularly to Fig. 3, the solenoid F comprises a cylindrical casing 50 which is provided at its lower end with a threaded sleeve 51 for securing the solenoid to the wall 52 of the transmission control assembly. A coil 53 of cylindrical configuration is disposed within the casing 50 and is supported therein by a cup-like member 54 having a cover 55. The coil 53 is spaced from the bottom of the cup-like member 54 by a disc 56. The coil 53 is connected by wires 200 to an appropriate electrical circuit and is provided with a centrally located longitudinally extending opening 57 in which is disposed a core member 58. The core member 58 is provided with a centrally located relatively small opening 59 which registers with openings 60 and 61 of the same size in the disc 56 and the cup-like member 54, respectively. The core member 58 is also provided with a concave frusto-conical surface 62 which registers with the opening 59 in the core member. The core member 58 at its upper end is provided with a large integral ring 63 which has the same diameter as the large base of the frusto-conical surface 68 and the inner surface 64 of the ring 63 abuts the surface 62 in a registering manner.

Disposed partially within the opening 57 of the coil 63 and above the core member 58 is a plunger 65. The plunger 65 is of cylindrical configuration and is adapted to cooperate with the core member 58 and the coil 53 to effect the operation of the solenoid. The plunger 65 at its lower end is provided with a reduced portion 66 which has a convex frusto-conical surface 67 at the lower part of the reduced portion 66 and a cylindrical surface 68 disposed between the frusto-conical surface 67 and the main portion of the plunger. The plunger 65 is also provided at its lower end with an axially bored opening 69 which receives one end of a non-magnetic rod 70, the latter extending through the registering openings 59, 60 and 61 in the core member 58, the disc 56 and the cup-like member 54, respectively. The other end of the rod 70 is threadedly secured to the plunger extension 41 which engages the ball valve E for effecting operation of the transmission control system.

It will be seen from the drawings that the concave and convex frusto-conical surfaces on the core member 58 and the reduced portion 66 of the plunger 65, respectively, are parallel and when the plunger 65 is in the position as shown in Fig. 3, the two surfaces form an air gap 100 therebetween. Similarly, the surfaces 68 and 64 of the reduced portion 66 and core member 58, respectively, form a second air gap 101. The air gap 101 is only effective when the surface 68 is disposed above the surface 64. This disposition is shown in Fig. 3. It will be seen that the lower edge of the surface 68 is adjacent the upper edge of the surface 64 and that the distance between these edges is smaller than the distance between the frusto-conical surfaces 62 and 67 when the solenoid is in its de-energized condition as shown in Fig. 3. When the coil 53 is energized a magnetic field is created and flux passed through the opening 57 in the coil. Since the plunger 65 and the core member 58 are magnetic materials, the flux readily passes through the opening in the coil and the only obstructions are the air gaps 100 and 101. The flux will, of course, take the path of least resistance and will, therefore, first bridge the smaller gap 101. Due to the passage of flux across the gap 101, the plunger 65 will be urged downwardly toward the core 58, the force exerted by the magnetic as well as the flux density becoming greater as the gap 101 becomes smaller. When, however, the surface 68 enters within the opening formed by the surface 64, there is no longer a sufficient change in the size of the air gap 101 and the surfaces around this gap becomes saturated. At this instant during the movement of the plunger, the flux changes and bridges the gap 100 and as the gap 100 gets smaller the flux density increases as well as the force created thereby.

In Fig. 4 I have shown, diagrammatically, the action of my improved solenoid. Curve A' illustrates the force-stroke relationship of a conventional solenoid having only one air gap. In curve A', the force steadily increases as the stroke increases, due to the fact that the flux density becomes greater as the air gap becomes smaller. In curve B' I have shown the force-stroke relationship of my improved structure. The initial rise shown at 150 is caused by the effect of the air gap 101 while the subsequent rise 151 is caused by the final movement of the plunger 65 under the influence of the magnetic flux bridging the gap 100. By the construction shown, a greater initial force is exerted by the plunger 65 as well as its extension compared to the conventional type illustrated by curve A' in Fig. 4.

While I have illustrated and described but one embodiment of my invention, it is to be understood that such is for the purpose of illustration only, and it is contemplated that those skilled in the art may modify certain details without departing from the spirit or scope of the invention as defined in the claim appended hereto.

I claim:

An electromagnetic operator comprising a magnetic field generating coil having an opening therein, a first core member disposed in said opening having an integral ring disposed at one end, the inner cylindrical surface thereof communicating with the larger extremity of a concave frusto-conical opening in said first core member, and a second core member disposed in said opening having a reduced portion provided with a convex frusto-conical surface forming an air gap with and parallel to said frusto-conical opening, said reduced portion of said second core member at the larger end of said convex surface terminating in a cylindrical surface, the juncture of said convex surface and said cylindrical surface of said reduced portion and the inner lateral edge of said ring being juxtaposed when said operator is de-energized to thereby effect the passage of a greater amount of magnetic flux between said last mentioned surfaces than between said frusto-conical surfaces when said operator is initially energized.

LOUIS B. FORMAN.

REFERENCES CITED

The following references are of record in the file of this patent:

UNITED STATES PATENTS

| Number | Name | Date |
| --- | --- | --- |
| 1,460,517 | Stevens | July 3, 1923 |
| 2,076,853 | Morgenstern | Apr. 13, 1937 |
| 2,330,407 | Claytor | Sept. 28, 1943 |
| 2,407,603 | Derungs | Sept. 10, 1946 |

OTHER REFERENCES

Magnets, by C. R. Underhill, pages 67, 68 and 69, McGraw Hill Book Co., Inc., New York, 1924.